United States Patent [19]

Nakamachi et al.

[11] Patent Number: 4,945,841

[45] Date of Patent: Aug. 7, 1990

[54] APPARATUS OR METHOD FOR CARRYING OUT COMBUSTION IN A FURNACE

[75] Inventors: Ichiro Nakamachi, Chiba; Kunio Yasuzawa, Kanagawa; Tadato Miyahara; Tkahiro Nagata, both of Tokyo, all of Japan

[73] Assignee: Tokyo Gas Company Limited, Tokyo, Japan

[21] Appl. No.: 353,822

[22] Filed: May 18, 1989

[30] Foreign Application Priority Data

May 25, 1988 [JP] Japan ................... 63-127979

[51] Int. Cl.$^5$ ............................... F23B 7/00
[52] U.S. Cl. ....................... 110/341; 431/174; 431/178; 431/180; 431/190; 431/116; 110/264
[58] Field of Search ......... 110/341, 263, 264; 431/174, 178, 179, 180, 190, 116

[56] References Cited

U.S. PATENT DOCUMENTS

| | | | |
|---|---|---|---|
| 3,869,244 | 3/1975 | Von Linde et al. | 431/116 |
| 3,994,670 | 11/1976 | Sheridan | 431/174 |
| 4,035,137 | 7/1977 | Arand | 431/174 |
| 4,395,223 | 7/1983 | Okigami et al. | 431/10 |
| 4,496,306 | 1/1985 | Okigami et al. | 431/174 |
| 4,505,666 | 3/1985 | Martin et al. | 431/175 |
| 4,669,398 | 6/1987 | Takahashi et al. | 431/178 |

FOREIGN PATENT DOCUMENTS 182005 10/1983 Japan ............................... 431/174

Primary Examiner—Henry A. Bennet
Assistant Examiner—Denise L. Ferensic
Attorney, Agent, or Firm—Wenderoth, Lind & Ponack

[57] ABSTRACT

A furnace and burner construction and method of burning fuel therein. The furnace housing has an end wall and side walls extending generally perpendicularly from the end wall and defining a furnace interior. One or more air supply ports open axially thereof through the end wall, and at least one fuel supply port opens axially thereof through the end wall and is spaced from the air supply port or ports. The air supply port is spaced from the side walls. When generally conical surfaces of jets of fuel and air are injected into the interior of the furnace through the air supply port or ports and the fuel supply port for carrying out burning of the fuel, recirculating currents of combustion products from the burning of the fuel are formed in the space between the jets and the side walls or between the jets themselves to lower the temperature of the burning.

17 Claims, 4 Drawing Sheets

APPARATUS OR METHOD FOR CARRYING OUT COMBUSTION IN A FURNACE

The present invention relates to an apparatus for carrying out combustion in a furnace, particularly an industrial furnace, and a method of operating said apparatus, said method being effective for controlling formation of nitrogen oxides (hereinafter called NOx).

BACKGROUND OF THE INVENTION

Conventional arrangements for carrying out combustion in industrial furnaces are shown in FIGS. 5 and 6. In FIG. 5, a fuel supply portion having laterally opening delivery ports at the delivery end thereof is positioned within an air supply portion b so that air is supplied along the entire periphery of the fuel supply portion. The fuel and air supplied as indicated by arrows from the respective supply portions a and b are mixed in a ceramic burner nozzle c to burn and generate a flame. In this combustion arrangement, since the area near the base of the flame which has the highest rate of combustion and also the highest temperature is surrounded by a thermally insulating wall constituted by the burner nozzle c, radial heat dissipation does not occur, and a large volume of NOx is generated by the high temperature flame, which is disadvantageous.

A combustion arrangement actually applied to a glass melting furnace is shown in FIG. 6. In this arrangement, an air supply portion b and a fuel supply portion a open directly into a furnace chamber d, but since there is little clearance between the surface e of the glass and the air supply portion b, gas recirculating currents are not formed in the furnace, and the air current simply flows along the glass surface e. Since the fuel is directly injected into the air current, the combustion product in the furnace is not mixed with the fuel or air, and therefore combustion at a low oxygen concentration does not occur, which inevitably raises the flame temperature. Thus, the NOx emission level is naturally high, which is disadvantageous.

OBJECT AND BRIEF SUMMARY OF THE INVENTION

The object of the present invention is to decrease the NOx generated by the combustion of fuel in any of various heating furnaces to a level lower than those achieved by conventional combustion arrangements.

To this end, the present invention provides furnace and burner construction comprising a furnace housing having an end wall and side walls extending generally perpendicularly from said end wall and defining a furnace interior, an air supply port means opening axially thereof through said end wall, and at least one fuel supply port opening axially thereof through said end wall and spaced from said air supply port means, said air supply port means having at least one air supply port spaced from said side walls sufficiently for providing a space in the interior of said furnace housing between the generally conical surfaces of jets of fuel and air injected into the interior of the furnace through said air supply port means and said fuel supply port, and the corners of said furnace interior between said end wall and said side walls. During operation of the furnace, recirculating currents of combustion products from the burning of the fuel are formed in those spaces to join with the jets and lower the temperature of combustion, thereby reducing generation of NOx.

DETAILED DESCRIPTION OF THE INVENTION

Figure 1A:
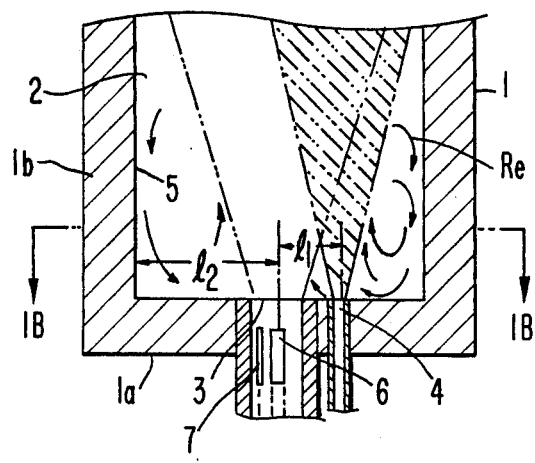
FIG. 1A is a longitudinal sectional view of a furnace with a burner apparatus according to the present invention.
Figure 1B:
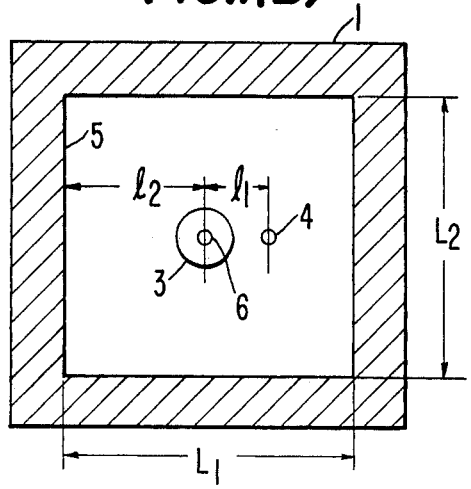
FIG. 1B is a sectional view along line 1B–1B of FIG. 1A.

As seen in FIGS. 1A and 1B, a furnace housing 1 defines a furnace interior 2. An air supply port 3 and a separate normal combustion fuel supply port 4 open into the interior 2 through an end wall 1a and are spaced from each other a distance $l_1$, as measured between the center axes thereof. Said air supply port 3 is spaced a distance $l_2$ from the inside surface 5 of a side wall 1b of the furnace as measured from the center axis of the air supply port 3. In this structure, air from said air supply port 3 and fuel from said fuel supply port 4 are injected into the furnace interior 2 in a direction axially of said ports for combustion, and as a result, recirculating currents are formed as indicated by arrows Re in FIG. 1A in the spaces between the generally conical surfaces of the jets of fuel and air and the corners of the interior 2 defined by walls 1a and 1b.

Figure 3A:
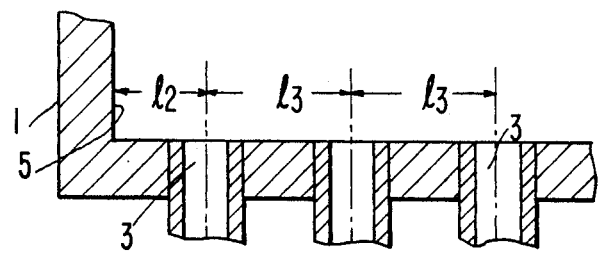
FIG. 3A is a sectional view similar to FIG. 1 showing an embodiment with plural air supply ports.

As seen in FIG. 1A, air supply port 3 has a fuel supply port 6 for low furnace temperature operation opening axially thereinto, which in the operation of the arrangement is opened while the temperature in the furnace interior 2 is lower than the ignition temperature of the fuel, for example, lower than 750° C., and the fuel supply port 6 for lower furnace temperature operation is closed and the normal operation fuel supply port 4 is opened when the temperature of the furnace interior 2 reaches the ignition temperature of the fuel, for example, higher than 750° C. In the structure as shown in FIG. 3A, plural air supply ports 3 open into the furnace interior 2, with a distance of $l_2$ between the one closest to the side wall 1b and the side wall, and with the respective air supply ports 3 spaced a distance $l_3$.

Figure 2A:
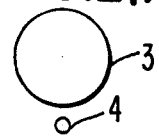
FIGS. 2A–2C are schematic views similar to FIG. 1B showing the positional relation between an air supply port and a fuel supply port or ports.
Figure 2B:
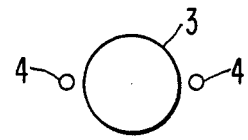
Figure 2C:
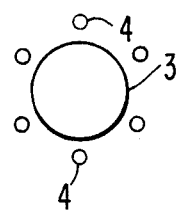

Alternatively, instead of having a simple fuel supply port 4, as shown in FIG. 2A, plural fuel supply ports 4 can be positioned around the air supply port 3 as shown in FIGS. 2B and 2C. Where plural air supply ports are provided, the fuel supply ports can be spaced therearound as shown in FIGS. 3B–3E.

Figure 5:
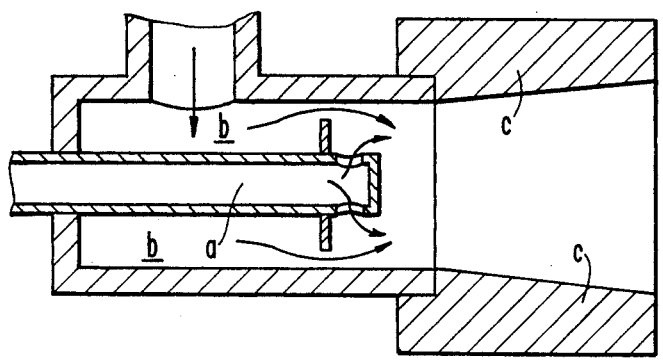
FIGS. 5 and 6 are longitudinal sectional views of conventional burner arrangements.
Figure 6:
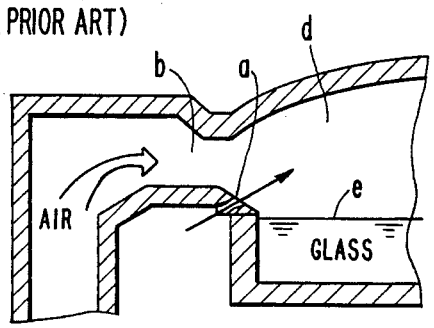

In the arrangement of Figs. 1A and 1B, when air and a fuel are injected separately from the air supply port 3 and the fuel supply port 4 into the furnace interior 2, air and the fuel are not mixed together directly, but are mixed only after they have been respectively at least partly mixed with the combustion products in the furnace. As a result, combustion occurs at a low oxygen concentration, which achieves the effect of decreasing generation of NOx. Furthermore, if the air and fuel injection takes place as described above, the mixing is delayed compared with the mixing of air and fuel in a coaxial injection current as in a conventional burner as shown in FIG. 5, and as a result, slow combustion takes place, which provides a low temperature flame which has no local high temperature portions. This further decreases generation of NOx.

In the combustion in the present invention as described above, the use of one air supply port 3 for one fuel supply port 4 generates a long flame, which may be undesirable for some applications. By surrounding the air supply port with plural fuel supply ports 4 as shown in FIGS. 2B and 2C, the fuel flow rate per fuel supply port 4 decreases, and the flame can be shortened.

Even by injecting the fuel other than in parallel to the air supply flow, such as at any angle against the air supply flow, or by using a fuel supply port 4 with a radial nozzle at the tip, mixing can be adjusted to control the length of the flame.

If the distance $l_2$ is too short, sufficient recirculating currents cannot be formed in the furnace, and the object of the present invention cannot be achieved. For instance, it is preferable that $l_2$ be not less than 1.5 times the diameter of the air supply port 3.

Moreover, depending on the shape and size of the furnace, it may be necessary to provide plural air supply ports 3 as shown in FIG. 3A-E. In this case, if $l_3$ is too short, the recirculating currents in the furnace interfere with each other. In this case, if $l_3$ is not less than 2 times the diameter of the air supply port 3, the mutual interference can be prevented.

In the combustion according to the present invention, since air and a fuel are respectively mixed with the combustion products in the furnace before combustion starts, as described above, combustion at a low furnace temperature would be unstable. Therefore, it is necessary to raise the temperature in the furnace up to the ignition temperature of the fuel gas by an appropriate means, such as any temperature raising burner or ignition source, at the start of operation. In the embodiment of the present invention shown in Figs. 1A and 1B, the fuel supply port 6 for low furnace temperature operation and an ignitor 7 are provided in the air supply port 3. In the operation of this embodiment, this raising of the temperature is produced by injecting the fuel only from the fuel supply port 6 for low furnace temperature operation contained in the air supply port 3 so that the mixing between air and the fuel starts as soon as the injection into the furnace interior 2 begins, and therefore the combustion in the furnace starts immediately and stably. Then, when the temperature in the furnace reaches a high temperature, for instance, higher than 750° C. the fuel supply port 6 is closed, and normal operation fuel supply port 4 is opened, and combustion is changed into combustion for achieving low generation of NOx.

In the present invention, mixing and combustion start in the furnace interior 2 as described above. Therefore, the area near the base of the flame, which is prone to have a high rate of combustion and high temperature is not surrounded by a thermally insulating wall or nozzle, but exists in the space within the furnace. In the furnace interior 2, there are usually present materials to be heated, such as steel or other molten metal, which have a lower temperature than the inner surface 5 of the furnace wall 1b. Therefore, as soon as the flame is generated in the space within the furnace, heat radiates to these low temperature materials, to lower the flame temperature. By this effect, a lowering of the NOx generation level can be achieved.

Figure 4:
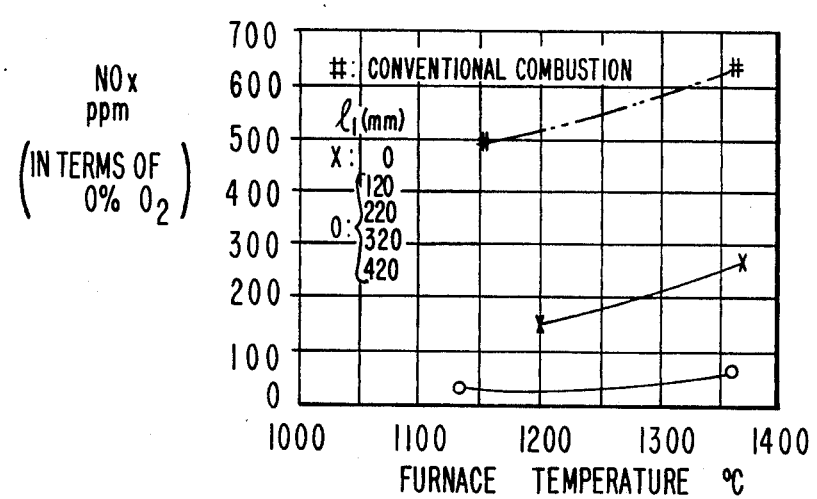
FIG. 4 is a NOx level diagram comparing the level of NOx produced by burning according to the present invention compared with a conventional apparatus and method.
Figure 3B:
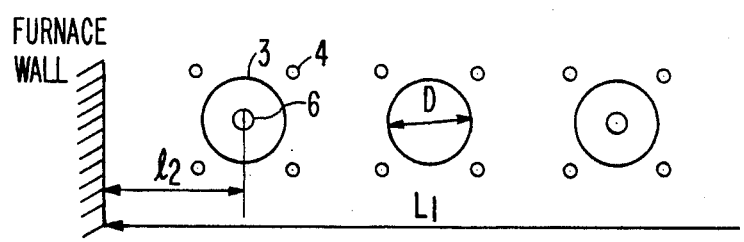
FIGS. 3B–3E are schematic views similar to FIGS. 2A–2C showing the positional relation between a plurality of air supply ports and fuel supply ports.
Figure 3C:
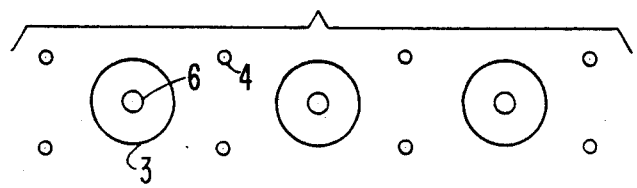
Figure 3D:
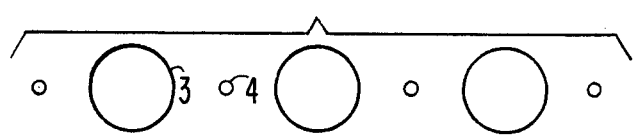
Figure 3E:
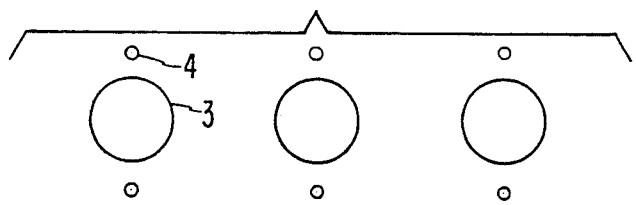

The following table gives data obtained by using an experimental furnace as shown in FIGS. 1A and 1B and data by conventional operation of a conventional furnace. FIG. 4 presents the data of the following table in a diagram. The experimental conditions were as follows:

$L_1 - L_2 = 1000$ mm
$l_1 = 300$ mm
Fuel ... Natural gas
Firing rate ... $50 \times 10^4$ kcal/h
Air temperature ... 400° C.
Air ratio ... 1.2

From the experimental data, it can be understood that the NOx was remarkably reduced, comapared with the conventional combustion method.

TABLE 1

|  |  | Furnace Temperature | | | |
|---|---|---|---|---|---|
|  | Conditions | 1200 | 1250 | 1300 | 1300 ~ 1500 |
|  |  | 530 | 560 | 590 | — |
|  | Glass Melting Furnace | — | — | — | 800 ~ 1200 |
|  | $l_1 = 0$ (mm) | 160 | 190 | 220 |  |
| NOx ppm | | 120 | 60 | 70 | 80 |
| (in Terms | | 220 | 55 | 60 | 70 |
| of O % $O_2$) | | 320 | 45 | 50 | 60 |
|  |  | 420 | 50 | 50 | 60 |

It will thus be seen that since air and fuel are injected directly into the furnace from points spaced along a furnace wall and only then mixed, the mixing velocity is low which causes slow combustion, and as a result, the flame temperature is lowered to generate less NOx. By keeping the distance between the air supply port nearest to the inner surface of the furnace wall, the inner surface of the wall and the mutual distances between the air supply ports sufficiently great, recirculating curents of combustion products are formed around the air and fuel supply ports, and before the combustion between air and the fuel starts, the combustion gas is mixed with air and the fuel. Therefore, the combustion occurs at a low oxygen partial pressure. This also lowers the flame temperature, so as to decrease generation of NOx.

Since the combustion starts and is completed in the furnace, the heat generated by combustion is radiated to lower temperature materials present in the furnace to be heated so as to lower the flame temperature, for decreasing generation of NOx.

What is claimed:

1. An apparatus comprising:
   a furnace housing, having an end wall and sidewalls extending generally perpendicularly from said end wall, defining a furnace interior;
   circulation means for supplying an air stream into said furnace interior spaced from said sidewalls in a portion of said furnace interior adjacent said end wall, for supplying a fuel steam into said furnace interior spaced from the air stream in the portion of said furnace interior adjacent said end wall, for mixing said air stream and said fuel stream in a portion of said furnace interior spaced from said end wall, for combusting the mixture of said fuel stream and air stream to generate combustion products, and for causing said combustion products to circulate in spaces formed in the portion of said furnace interior adjacent said end wall between said air stream and said sidewalls and between said air stream and said fuel stream and to mix with said air stream said fuel stream prior to said fuel stream and said air stream mixing together;

said circulation means comprising at least one air supply port opening through said end wall and spaced at least a first predetermined distance from said sidewalls, and at least one fuel supply port opening through said end wall and spaced at least a second predetermined distance from said air supply port.

2. An apparatus as recited in claim 1, further comprising a start-up fuel supply means for supplying fuel into said furnace interior only when the temperature within said interior is below a predetermined ignition temperature.

3. An apparatus as recited in claim 2, wherein said start-up fuel supply means is mounted concentrically within said air supply port.

4. An apparatus as recited in claim 1, wherein said circulation means supplies a conically-shaped air stream and a conically-shaped fuel stream into said furnace interior.

5. An apparatus as recited in claim 1, wherein said at least one fuel supply port comprises a plurality of fuel supply ports spaced from said air supply port by at least said second predetermined distance.

6. An apparatus as recited in claim 5, wherein said plurality of fuel supply ports are spaced about said air supply port.

7. An apparatus as recited in claim 1, wherein said at least one air supply port comprises a plurality of air supply ports, each of which is spaced from said sidewalls by at least said first predetermined distance and each of which is spaced from one another by at least a third predetermined distance.

8. An apparatus as recited in claim 7, wherein said third predetermined distances are sufficient to provide spaces, between air streams emanating from said plurality of air supply ports in the portion of said furnace interior adjacent said end wall, within which said combustion products circulate.

9. An apparatus as recited in claim 8, wherein each of said plurality of air supply ports has a diameter, said first predetermined distance is at least 1.5 times said diameter, and said third predetermined distance is at least 3 times said diameter.

10. An apparatus as recited in claim 1, wherein said air supply port has a diameter, and said first predetermined distance is at least 1.5 times said diameter.

11. A method of burning fuel in a furnace having a furnace housing, having an end wall and sidewalls extending generally perpendicularly from said end wall, defining a furnace interior, comprising:

supplying an air stream into said furnace interior through at least one first opening in said end wall spaced at least a first predetermined distance from said sidewalls such that said air stream is spaced from said sidewalls in a portion of said furnace interior adjacent said end wall;

supplying a fuel stream into said furnace interior through at least one second opening in said end wall spaced at least second predetermined distance from said first opening such that said fuel stream is spaced from said air stream in the portion of said furnace interior adjacent said end wall; and igniting a mixture of said fuel stream and said air stream and thereby generating combustion products;

such that said air stream and said fuel stream mix together in a portion of said furnace interior spaced from said end wall, said combustion products circulate in the spaces formed between said air stream and said sidewalls and between said fuel stream and said air stream, and said combustion products mix with said fuel stream and said air stream prior to said fuel stream and said air stream mixing together.

12. A method as recited in claim 11, further comprising supplying fuel, through a start-up fuel supply port located concentrically within said first opening, when the temperature within said furnace interior is below a predetermined ignition temperature.

13. A method as recited in claim 12, further comprising terminating supply of said fuel through said start-up fuel supply port when the temperature within said furnace interior reaches said predetermined ignition temperature.

14. A method as recited in claim 12, wherein said fuel stream is supplied into said furnace interior only after the temperature within said furnace interior reaches said predetermined ignition temperature.

15. A method as recited in claim 11, wherein the supplying of an air stream comprises supplying air streams through a plurality of first openings in said end wall spaced at least said first predetermined distance from said sidewalls such that spaces are formed between said air streams and said sidewalls in the portion of said furnace interior adjacent said end wall.

16. A method as recited in claim 11, wherein the supplying of a fuel stream comprises supplying fuel streams are supplied through a plurality of second openings in said end wall spaced at least said second predetermined distance from said first opening such that spaces are formed between said fuel streams and said air stream in the portion of said furnace interior adjacent said end wall.

17. A method of burning fuel in a furnace having a furnace housing, having an end wall and sidewalls extending generally perpendicularly from said end wall and defining a furnace interior, comprising:

supplying air into said furnace interior through a first opening in said end wall spaced at least a first predetermined distance from said sidewalls;

supplying fuel into said furnace interior together with said air and causing combustion to take place when the temperature in said furnace interior is below a predetermined ignition temperature;

terminating the supply of fuel when the temperature in said furnace interior reaches said predetermined ignition temperature; and when the temperature in said furnace interior reaches said predetermined ignition temperature, supplying fuel into said furnace interior through a second opening in said end wall spaced at least a second predetermined distance from said first opening.

* * * * *